United States Patent [19]

Bryan

[11] Patent Number: 4,919,883

[45] Date of Patent: Apr. 24, 1990

[54] LOWER END FITTING DEBRIS COLLECTOR AND END CAP SPACER GRID

[75] Inventor: William J. Bryan, Granby, Conn.

[73] Assignee: Combustion Engineering, Inc., Windsor, Conn.

[21] Appl. No.: 284,018

[22] Filed: Dec. 14, 1988

[51] Int. Cl.$^5$ .................. G21C 19/30; G21C 3/32
[52] U.S. Cl. .................. 376/352; 376/313; 376/440
[58] Field of Search .............. 376/352, 442, 437, 440, 376/313

[56] References Cited

U.S. PATENT DOCUMENTS

| | | | |
|---|---|---|---|
| 2,948,517 | 8/1960 | Cosner | 376/440 |
| 3,928,126 | 12/1975 | Seim et al. | 376/440 |
| 4,152,206 | 5/1979 | Jabsen | 376/440 |
| 4,297,171 | 10/1981 | Olsson | 376/440 |
| 4,391,771 | 7/1983 | Anthony | 376/440 |
| 4,684,495 | 8/1987 | Wilson et al. | 376/352 |
| 4,684,496 | 8/1987 | Wilson et al. | 376/352 |
| 4,781,884 | 11/1988 | Anthony | 376/352 |
| 4,792,428 | 12/1988 | Canat et al. | 376/440 |
| 4,828,791 | 5/1989 | DeMario | 376/352 |
| 4,832,905 | 5/1989 | Bryan et al. | 376/352 |

Primary Examiner—Harvey E. Behrend
Attorney, Agent, or Firm—John H. Mulholland

[57] ABSTRACT

A fuel assembly (10) has a lower end fitting debris collector and end cap spacer grid (20) assembled in the form of a welded assembly of an "eggcrate" grid (21) and cast base (40) with hollow legs (42). Fastener seats (46) in hollow legs (42) permit guide tubes (14) with internally threaded ends to be joined to the upper surface of the lower end fitting debris collector (20) by means of slotted fasteners (50). End caps (22) rest on grid (21) at the intersection of slottedly interlocked bars (24 and 26). Thin strips (30) mounted in slots between bars (24) and bars (26) provide small debris catching openings in grid (21). Thick strips (30a) project upwardly between strips (30) to limit lateral movement of the end caps. Projections (70) on bars (24) prevent axial fuel rod movement by engagement of tab (70a) in circumferential groove (23) of end caps (22). Opposing capture force is provided by a wire (72) which is supported in openings in thick strips (30a) and which is received in groove (23).

1 Claim, 4 Drawing Sheets

LOWER END FITTING DEBRIS COLLECTOR AND END CAP SPACER GRID

FIELD OF THE INVENTION

This invention relates to nuclear fuel assemblies and in particular those assemblies which include spaced fuel rod support grids mounted in a reactor core as a unit. In the prior art, the fuel rods are held between an upper end fitting and a lower end fitting by means of spacer girds. Guide tubes provide the structural integrity between the lower end fitting, the upper end fitting and the spacer grids intermediate the ends of the fuel assembly. The spacer grids define an array of fuel rods which, typically, may be rows and columns of 16 rods each. One such spacer and support grid is disclosed in U.S. Pat. No. 3,481,832. The reactor coolant flows upwardly through holes in the lower end fitting, along the fuel rod lower end caps and upwardly along the fuel rod cladding and through the spacer grids in the active region of the fuel assembly. For a lower end fitting debris collector, see U.S. patent application Ser. No. 7/181,805, filed Apr. 15, 1988 and assigned to the same assignee as the instant invention. The instant invention is a modification of the invention there disclosed.

BACKGROUND OF THE INVENTION

Debris in the coolant which collects or is trapped in fuel rod spacer grids is believed responsible for as many as 30% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable. In fact, metal fragments which can only be picked up with tweezers have been known to "drill" a hole in fuel rod cladding in less than 1,000 hours of operation. Since most failures occur either within or below the first spacer grid, the grids apparently provide a rather good screen for collecting debris. In order to prevent damage in the active area of the reactor, the applicant set out to design a device which will trap a large percentage of debris before it gets to the active area.

Previous attempts to treat the debris problem have involved grids in the region of the lower end fitting and the lower rod support grid. One such attempt is the subject of U.S. patent application Ser. No. 020,816 entitled "Debris Catching Strainer Grid", filed Mar. 2, 1987 by Andrew J. Anthony and assigned to the assignee of the instant invention. This grid is typically welded to the upper side of the lower end fitting. Other examples of debris strainers, or traps and grids are seen in U.S. Pat. Nos.: Re. 27,950; 4,684,495; 4,684,496; 4,652,425; 4,678,627; 4,427,624: 4,096,032; and Japanese Application 53-8277, 1-30-1978 (Kokai 54-102493, 8-11-1979); German Auslegeschrift 1,211,342 (Anmeldetag Feb. 2, 1960); and British Pat. No. 1,214,998. None of these attempts have been totally effective for the purpose intended for reasons of compromise between cost, pressure drop during coolant flow and debris retainability.

Most debris related failures in nuclear reactor fuel are caused by metal shavings, turnings, and pieces of wire that remain in the primary coolant system after maintenance operations. Because of their noncompact shapes, shavings and turnings can be removed from the coolant by passing it through screens having comparatively large holes. More prior art debris interception schemes make use of this technique because it is readily incorporated into existing fuel designs by using a greater number of smaller holes in the lower end fitting.

Debris in the form of wires, having comparatively small cross sections, are more difficult to trap in these devices. Even if these wires strike the debris trap broadside, they have a tendency of bouncing off, letting them have another opportunity to penetrate the screen. In order to remove wires from the coolant, flow holes would have to be so small that the pressure drop through them would become unacceptably high, as would their production cost.

SUMMARY OF THE INVENTION

Since the mechanism for failure involves the entrapment of debris in spacer grids, or between fuel rods, a grid structure specifically designed to capture debris in a similar manner and at the same time to function as the lower end fitting and lower end spacer grid of the fuel assembly below the fuel rod cladding is provided. The filtering and spacing device is contained in a new form of end fitting which has debris trapping grid ligaments, captures the circumferentially grooved fuel rod end caps and provides reduced net pressure drop.

The invention consists of an eggcrate type grid of thick strips or bars, which typically houses two thin strips and one intermediate thick strip between upper pairs of thick strips or bars in the upper portion of the grid and two thin strips and one intermediate thick strip between lower pairs of thick strips or bars normal to the upper thick strips or bars in the lower portion of the grid, to filter out debris. The bars or thick strips of the eggcrate support the fuel rods and guide tubes while holding the filter strips in place. The bars are provided with projecting portions which engage the fuel rod end caps at a first circumferential location above and below the circumferential groove. A spring means in the form of a wire is secured to the grid by means of holes in the thick strips, in upper portions thereof that extend above the bars to the elevation of the end cap grooves. The spring wires engage the end cap grooves at locations opposite the first locations. The elevated thick strips project upwardly adjacent the end caps to provide end cap lateral movement restraining walls and thereby to define an end cap spacer grid compartment with a pair of circumferentially opposite bar projecting portions and spring wires. The invention is shown in the form of a 16×16 lower end fitting.

The eggcrate, typically, consisting of 0.0625 inch or 0.0937 inch bars, thick strips or ligaments is assembled first. It is made of either a low carbon containing stainless steel or Inconel. Thin strips and intermediate thick strips are then inserted and assembled into the eggcrate in slots in the bars.

By changing the fluid flow conditions around and through the screening device noted above, it is possible to eliminate some of the prior art shortcomings and to reduce production costs. This is accomplished by locating the thinner screening ligaments in two different planes. This causes the debris to be more easily trapped. Debris, entrained in the fluid, tends to rub against the thin ligaments of the lower plane, causing them to turn in such a fashion as to be trapped by the upper plane of thin ligaments normal to those of the lower plane.

Further modifications to the novel lower end fitting bar intersections may be provided to allow the lower end caps of the fuel rods to rest within mated cutouts in the thicker lower end fitting ligaments or bars, thereby providing additional fuel rod shoulder gap and lateral support.

PREFERRED EMBODIMENTS OF THE INVENTION

Figure 5:
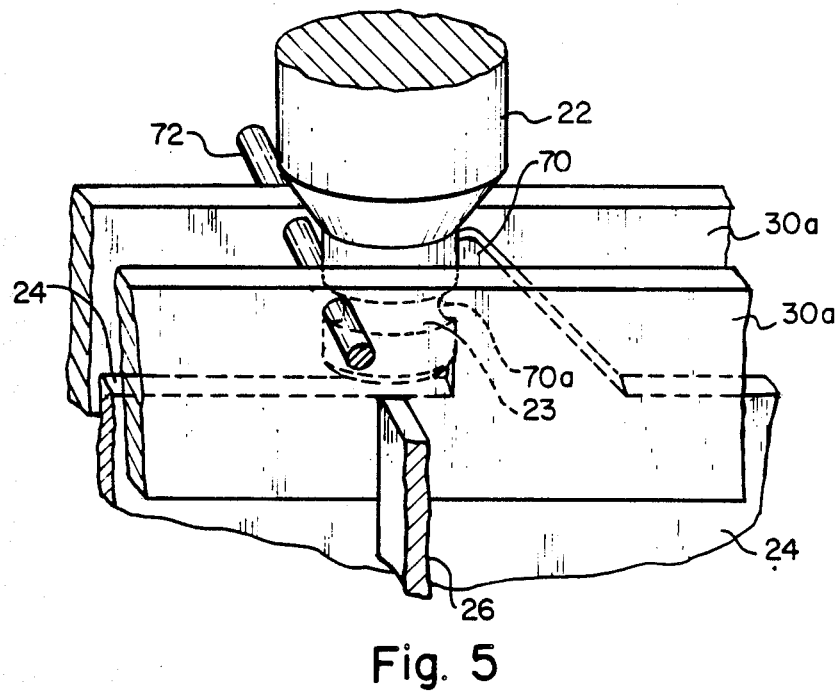
FIG. 5 is an isometric schematic fragmentary view of an end cap compartment of the lower end fitting debris and spacer grid collector of FIGS. 1-4.
Figure 6:
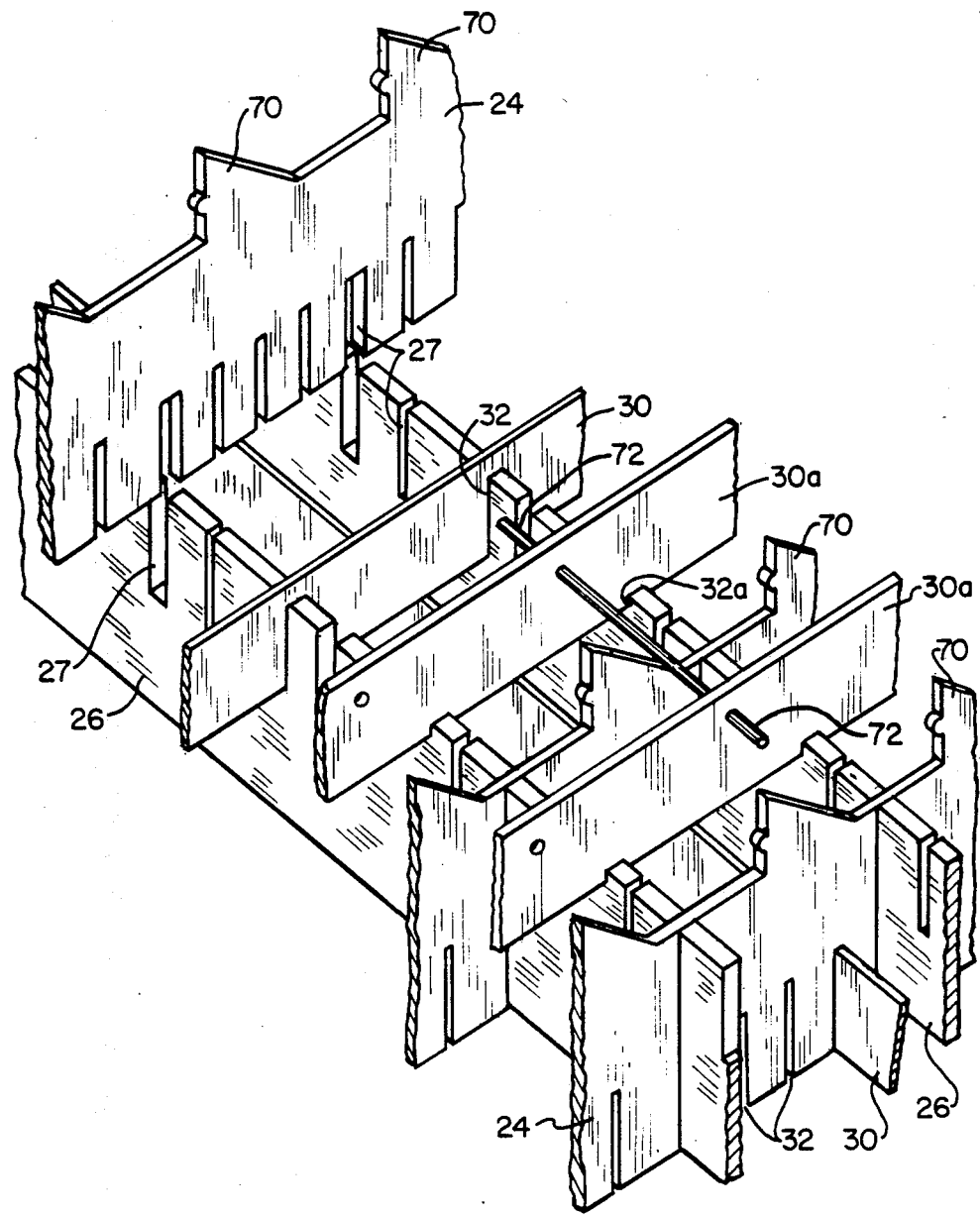
FIG. 6 is an isometric schematic view of the lower end fitting debris collector and end cap spacer partially assembled.

The numeral 10 generally designates a fuel assembly unit. The fuel assembly 10 includes an upper end fitting 12, guide tubes 14, spacer grids 16 supporting fuel rods 17, and a lower end fitting debris collector and end cap spacer grid constructed primarily of Inconel according to the principles of the invention, generally designated by the numeral 20. Behind the lower end fitting debris collector and end cap spacer grid perimeter are debris trapping compartments (FIG. 5) defined by the lower end fitting debris collector grid 21 and solid fuel rod end caps 22. Each fuel rod end cap 22 has a circumferential groove 23 and is located at the intersection of first intersecting and slottedly interlocked grid forming bars 24, known as top bars because of their lower slots 27, and second grid forming bars 26, which are known as bottom bars because of their upper slots 27 for slottedly interlocking with the grid forming bars 24 along their upper margin. When assembled, the bars 24 in the area of intersection are above the bars 26. The pairs of first and second intersecting and slottedly interlocked grid forming bars 24 and 26 are attached to the perimeter strip 28. Members 24, 26 and 28 may be of Inconcel 718.

The upper bars strips 24 are parallel to each other and the lower bars 26 are parallel to each other and normal to the upper bars 24. All of the bars 24 and 26 are welded or brazed to the rectangular perimeter strip 28.

The grid 21 is completed suitable metal strips 30, 30a which are parallel to and mounted between the bars 24 and 26, typically, in groups of two thin strips 30 and one intermediate thick strip 30a. The strips 30 and 30a mounted in slots 32 and shallow slots 32a of the bars 24 are normal to the strips 30 mounted in slots 32 and 32a of bars 26. As shown, the strips 30 mounted in slots 32 of bars 24 are in engagement with the strips 30 mounted in slots 32 of bars 26, but this is not necessary. All of the strips 30 are welded or brazed to the perimeter strip 28.

Figure 1:
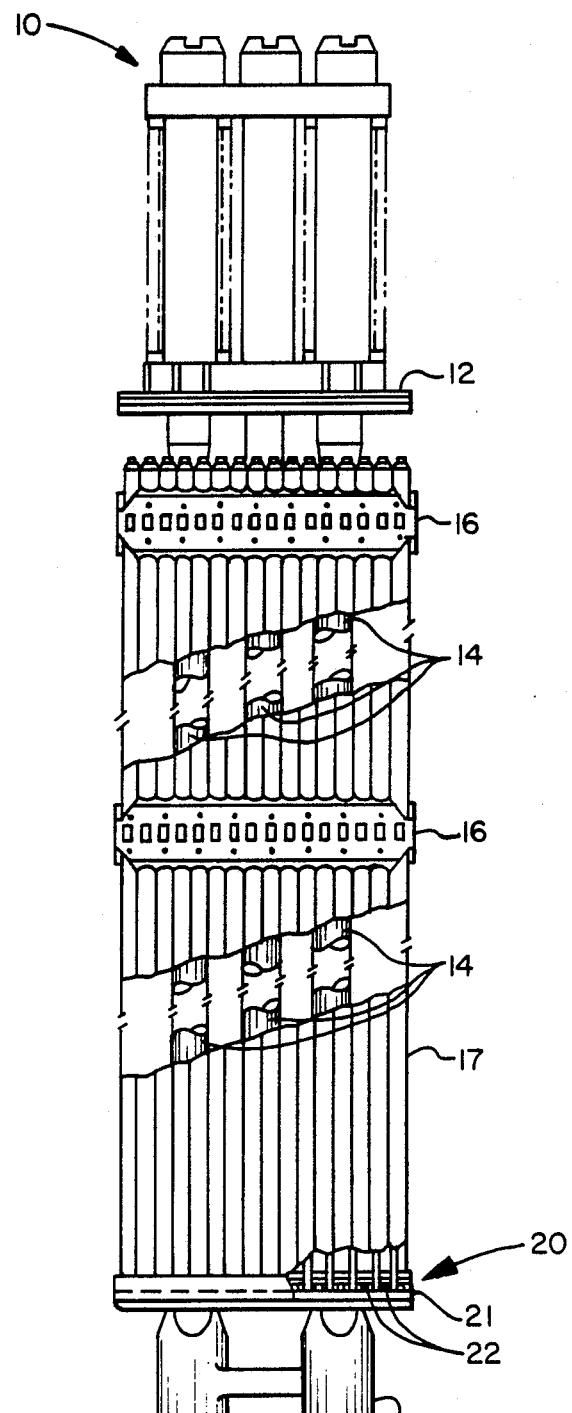
FIG. 1 is a side elevational view of a fuel assembly configuration including the lower end fitting debris collector and end cap spacer grid of the invention.
Figure 2:
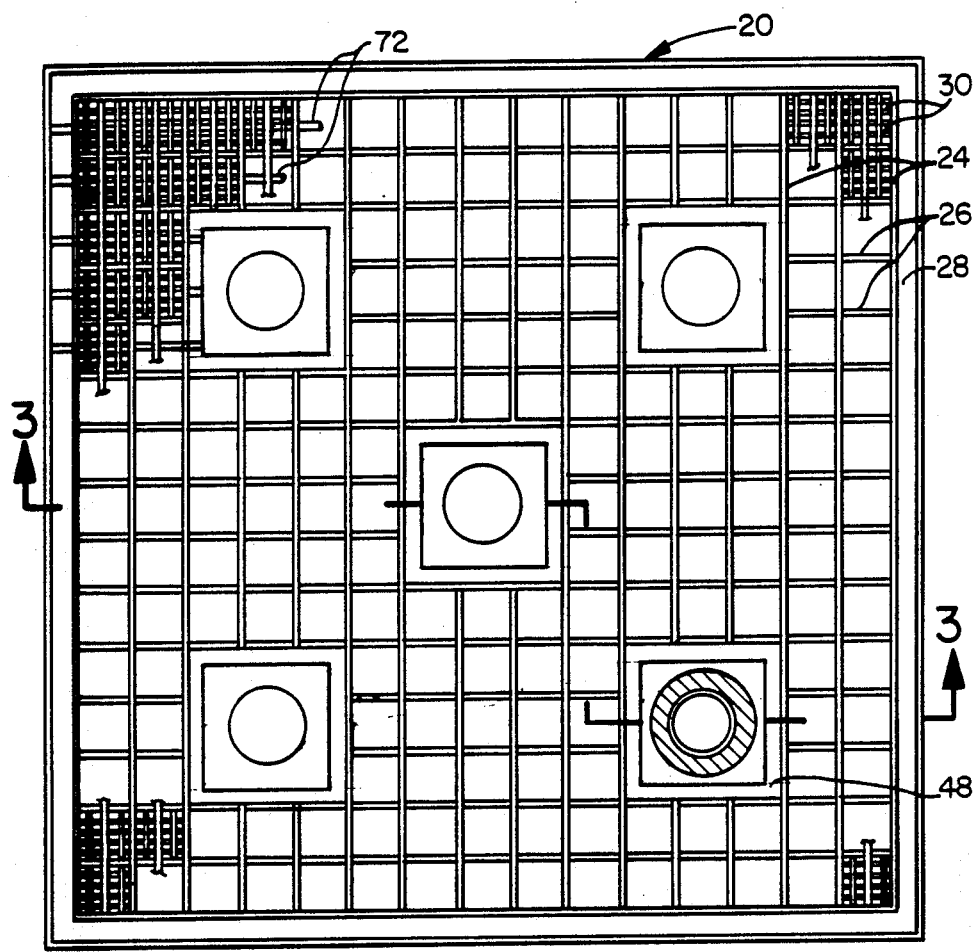
FIG. 2 is a top plan view of the lower end fitting debris collector and end cap spacer grid of FIG. 1 with a representative guide tube end partially shown.
Figure 3:
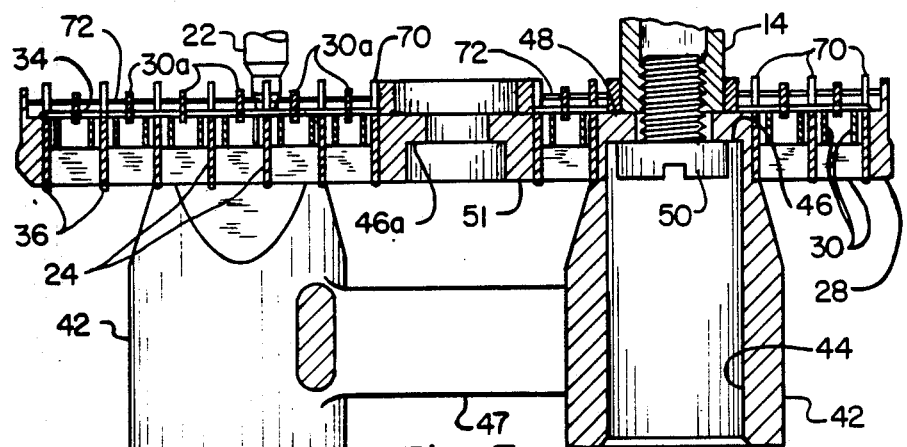
FIG. 3 is a cross-sectional view taken along the line 3—3 of FIG. 2.
Figure 4:
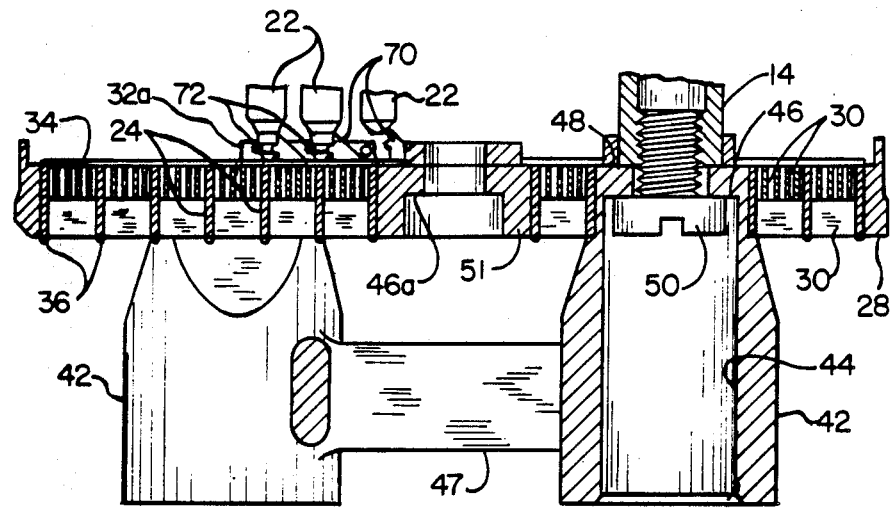
FIG. 4 is a view similar to FIG. 3 taken at 90° thereto, with parts broken away for clarity.

It has been found advantageous in welding to lay a weld bead 34 along the length of the upper edges of bars 26 to hold the bars 24 and 30 of the top side of the grid 21 in assembled relation therewith and to lay a weld bead 36 along the length of the lower edges of bars 24 to hold the bars 26 and 30 of the bottom side of the grid 21 in assembled relation therewith, as shown in FIG. 3.

A lower end fitting debris collector base member 40 is provided which is, typically, a casting of a suitable stainless steel alloy such as A.I.S.I. 304. The base member 40 is welded to bars 24 and 26. In the form illustrated, the base 40 has hollow legs 42 with fastener receiving interior cavities or bores 44 and fastener seats 46. The legs 42 are joined by web members 48 and each leg is welded or brazed into an opening cut into or formed in the grid 21. A flat upper surface 48 of each leg 42 is basically flush with the grid 21 except for a spring supporting peripheral flange and supports a guide tube 14.

A fastener 50 with a slotted head seated against fastener seat 46 is threaded into the end of an internally threaded end of guide tube 14 to secure the guide tube 14 and lower end fitting debris collector 20. Typically, four guide tubes 14 are thus secured.

In the central portion of grid 21, an insert 51 is provided instead of a leg 42 for providing means to fasten the central guide tube 14. Insert 51 is hollow, has a spring engaging peripheral flange, and has a fastener seat 46a for retaining the head of a fastener 50. It is welded or brazed within an opening in grid 21.

The bars 24 include projecting portions 70 which engage the end caps 22 at a first circumferential location on either side, above and below, the circumferential groove 23. Spring means in the form of a wire 72 pass through the strips 30a which are secured to the bars 26 of the grid in shallow slots 32a. The lower end fitting debris collector and end cap spacer grid 20 restrains axial movement of the fuel rods by means of a tab 70 on a projecting portion 70 which enters groove 23 of end cap 22. The wire 72 also enters the groove 23 at a second end 180° opposite circumferential location. The diameters end cap groove 23 and curved surfaces of wire 72 and tab 70a are such that the fuel rod can be removed during fuel reconstitution but cannot axially dislocate due to coolant flow.

The lateral capture and motion limitation of the fuel rod occurs by engagement of end cap 22 with a thick strip 30a on either side of the end cap.

In all filtering concepts, it must be noted that filterings will not be 100%. Certain deleterious debris can still escape. The effectiveness of the filter is determined by the amount of debris it will filter. The filtering effectiveness of the novel debris collector lower end fitting and spacer grid of the invention should be better than most other devices with the advantage of not adversely affecting fuel rod plenum volume, fuel rod reconstitutability and fuel rod support. Therefore, while it is not possible to entirely eliminate fuel rod failure due to debris, the risk of failures can be greatly reduced by means of the instant invention, thereby increasing fuel assembly reliability without compromising design integrity in the abovementioned ways. Moreover, by eliminating the conventional lower spacer grid and lower end fitting as separate items of the fuel assembly, pressure drop is not a problem with the debris trapping grid members.

I claim:

1. In a nuclear reactor having fuel assemblies including an upper end fitting and spaced nuclear fuel rod spacer grids for supporting and spacing a plurality of elongated nuclear fuel rods, each of which includes a hollow active portion of nuclear fuel filled cladding intermediate the rod ends and tapering end cap of solid material with a circumferential groove on the rod end which first encounters reactor coolant flow, a lower end filtering debris collector and end cap spacer grid for capturing and retaining deleterious debris carried by reactor coolant before it enters the active region of a fuel assembly and creates fuel rod cladding damage, comprising in combination:
- a polygonal perimeter member,
- a plurality of debris trapping compartments defined by a plurality of parallel first slotted bars and parallel second slotted bars intersecting and slottedly interlocked with said first bars in a grid-forming arrangement in which the bars are attached to said perimeter member and to each other,
- a first plurality of parallel strips mounted on said second bars and between said first bars on a first side of said grid,
- a second plurality of parallel strips mounted on said first bars and between said second bars on the side thereof opposite said first side of said grid in an orientation normal to said first plurality of parallel strips,
- at least some of said bars including projecting portions engaging said end caps at a first circumferential location thereof,
- spring means secured to said grid formed by said bars by means of at least some of said strips and engaging the circumferential grooves at a second circumferential location opposite said first,
- said spring means securing strips projecting upwardly adjacent the end caps to provide end cap lateral movement restraining walls and to define an end cap spacer grid compartment with the circumferentially opposite bar projecting portions and spring means.

* * * * *